US006729540B2

(12) United States Patent
Ogawa

(10) Patent No.: US 6,729,540 B2
(45) Date of Patent: May 4, 2004

(54) SYSTEM FOR MANAGING DYNAMIC SITUATIONS OF WASTE TRANSPORTING VEHICLES

(75) Inventor: Mitsuaki Ogawa, Tokyo (JP)

(73) Assignee: Nisscom Corporation, Tokyo (JP)

( * ) Notice: Subject to any disclaimer, the term of this patent is extended or adjusted under 35 U.S.C. 154(b) by 0 days.

(21) Appl. No.: 10/092,733

(22) Filed: Mar. 8, 2002

(65) Prior Publication Data

US 2002/0125315 A1 Sep. 12, 2002

(30) Foreign Application Priority Data

Mar. 8, 2001 (JP) ........................................ 2001-65672

(51) Int. Cl.[7] .......................... G07B 15/02; G06F 17/00
(52) U.S. Cl. ........................................ 235/384; 235/375
(58) Field of Search ................................ 235/375, 329, 235/325

(56) References Cited

U.S. PATENT DOCUMENTS 5,347,274 A * 9/1994 Hassett ........................ 340/988
6,070,793 A * 6/2000 Reichl et al. ............... 235/375
6,142,372 A * 11/2000 Wright ....................... 235/382
6,321,983 B1 * 11/2001 Katayanagi et al. ........ 235/380
6,421,586 B1 * 7/2002 Nicotera ........................ 701/1
6,539,296 B2 * 3/2003 Diaz et al. .................... 701/33

FOREIGN PATENT DOCUMENTS

JP 9-142609 6/1997
JP 10-95505 4/1998
JP 10-95506 4/1998
JP 10206219 A * 8/1998 .......... G01G/19/40

* cited by examiner

*Primary Examiner*—Thien M. Le
*Assistant Examiner*—April A. Nowlin
(74) *Attorney, Agent, or Firm*—Westerman, Hattori, Daniels & Adrian, LLP

(57) ABSTRACT

A system for managing dynamic situations of wastes and waste transporting vehicles using barcodes comprises a unit for measuring a position of each of the waste transporting vehicles, and a unit for monitoring a transport route of each vehicle based on the measured position. When the measuring unit measures the position of the waste transporting vehicle, the monitoring means monitors the transport route of the vehicle based on the measured position, thereby managing the transport route of the vehicle and arrival to a disposal site in real time in a centralized manner. The system further comprises a unit for monitoring a vehicle transporting wastes to a disposal site, and the monitoring unit comprises an ID tag attached to the waste transporting vehicle, an ID tag reader provided in an access passage to the disposal site, and, as required, an opening/closing gate opened and closed in accordance with a result of reading the ID tag, whereby arrival of the waste transporting vehicle to the final disposal site is monitored.

4 Claims, 3 Drawing Sheets

SYSTEM FOR MANAGING DYNAMIC SITUATIONS OF WASTE TRANSPORTING VEHICLES

BACKGROUND OF THE INVENTION

1. Field of the Invention

The present invention relates to a system capable of managing (or collecting information with regard to) disposal situations of wastes in real time even by a third party. More particularly, the present invention relates to a system for managing dynamic situations of wastes, which is able to realize centralized management of transport routes of waste transporting vehicles for transporting wastes generated in particular facilities, construction sites, etc., arrival of the vehicles to a disposal site, and dumping of the wastes, and which enables management information to be provided even to a third party.

2. Description of the Related Art

Transportation of wastes generated in construction sites, etc. from places of waste generation to a final disposal site and dumping of the wastes in the final disposal site are performed by small- to medium-size companies under subcontract at present. However, a company who has subcontracted disposal of wastes has no means for monitoring how the wastes are transported to a disposal site and then dumped in the disposal site after delivery of the wastes to the companies under subcontract. This has raised a problem that it is impossible to confirm the places to which the wastes have been transported by the companies under subcontract, and in which the wastes have been dumped.

To overcome the above-mentioned problem, as one of systems for preventing illegal dumping of industrial wastes, Japanese Patent Laid-Open Publication 9-142609, entitled "Industrial-Waste Disposal and Management Information System", proposes a waste disposal and management information system for monitoring dynamic situations of industrial-waste transporting vehicles by utilizing satellite communication and the GPS (Global Positioning System).

With the proposed system, a management terminal receives position information of the waste transporting vehicle, which is computed by an onboard terminal of the waste transporting vehicle based on electronic waves received from a GPS satellite, monitors the transport route of the waste transporting vehicle based on the received position information, and further monitors arrival of the waste transporting vehicle to a waste disposal site, i.e., a final destination of the transport route. Therefore, the proposed system is able to monitor travel situations and loading/unloading situations of the individual waste transporting vehicles, but is not intended to monitor the particulars of the loaded wastes and disposal/dumping situations.

In consideration of the above, the inventor has already developed and proposed "Collected-Waste Disposal Information System" (Japanese Patent Laid-Open Publication 10-95505, referred to as "SCMS" (Satellite Communication Management System) hereinafter) utilizing the GPS, SCMS II (Japanese Patent Laid-Open Publication 10-95506) that is an improved version of SCMS, i.e., a system for monitoring and preventing general wastes from being carried into an incineration facility not designated (public incineration site outside a specific area), as well as SCMS III that has improved communication systems of SCMS and SCMS II.

To explain SCMS in more detail, it is a system for monitoring a flow of waste disposal by collecting information using satellite communication so that waste disposal steps carried out by a waste source company, a collecting/transporting company and an intermediate treating company can be managed, and for rapidly preparing and providing necessary information from the collected information. Thus, SCMS is a system for managing works and travel of waste transporting vehicles by monitoring a flow of waste disposal while collecting information using satellite communication so that waste disposal steps carried out by a waste source company, a collecting/transporting company and an intermediate treating company can be managed, and for rapidly preparing and providing necessary information from the collected information.

Specifically, SCMS is a system for managing works and travel of waste transporting vehicles with satellite communication by employing a barcode label and a load slip in combined manner, the load slip containing necessary items put on it based on related information, including barcode information, inputted to a terminal for satellite communication. Stated otherwise, SCMS is a system for managing works and travel of vehicles for transporting wastes under special management with satellite communication by employing a barcode label and a load slip in combined manner, the load slip containing necessary items put on it based on related information, including barcode information, inputted to a terminal for satellite communication.

Furthermore, SCMS is a waste disposal information system for monitoring a flow of waste disposal while collecting information using satellite communication so that waste disposal steps carried out by a knocking-down/waste source company, a collecting/transporting company and an intermediate treating company can be managed, and for rapidly preparing and providing necessary information from the collected information, the system employing a barcode label and a load slip in combined manner, the load slip containing necessary items put on it based on related information, including barcode information, inputted to a terminal for satellite communication.

The above waste disposal information system is applied to wastes under special management with satellite communication by employing a barcode label and a load slip in combined manner, the load slip containing necessary items put on it based on related information, including barcode information, inputted to a terminal for satellite communication.

Those systems have been developed for collecting and managing wastes under special management (including classified wastes that are explosive, toxic or infectious and possibly hurt human health and living environments, but also general wastes that are generated in large amount and may give rise to a substantial influence from the viewpoint of environment pollution when dumped). From viewpoint of collecting information, information directly indicating dynamic situations of waste transporting vehicles is also effective other than reading of a barcode attached to a load. As a matter of course, information collection may be performed by utilizing both types of information in combined use or utilizing one type of information for supplemental purpose.

SCMS II is an improved version of SCMS and intends to collect information based on information directly indicating dynamic situations of waste transporting vehicles instead of reading a barcode. Such information collection can be realized with SCMS II by setting an onboard terminal for satellite communication, which is used in SCMS, in each of permitted waste transporting vehicles and then doing works in the same manner as in SCMS.

More specifically, information regarding dynamic situations of the waste transporting vehicle is collected by adding, to each waste transporting vehicle used with SCMS, the function of sensing actuation of a loading device with a sensor at the time of loading wastes on the vehicle and then transmitting sensed information to an SCMS management center via a communication satellite, the function of sensing dumping or unloading operation performed for disposal of the wastes that have been carried into an incineration facility, and then transmitting sensed information to the SCMS management center via the communication satellite, etc.

Waste management in accordance with SCMS and SCMS II is automatically performed at the SCMS management center using the satellite communication system. Data regarding when and where the waste transporting vehicle has collected wastes and when and where the waste transporting vehicle has unloaded the collected wastes, etc. is obtained by the SCMS management center via the satellite communication system. The obtained data is automatically subjected to matching work with a computer so as to check whether the obtained data are matched with the preset management information and conditions. Thus, SCMS and SCMS II are able to prevent illegal dumping of wastes by monitoring the occurrence of problems such as "waste dumping at improper places", "waste dumping outside designated area", and "improper mixing of wastes".

In SCMS and SCMS II, information is exchanged between the waste transporting vehicles and the management center using the satellite communication system. However, the satellite communication is disadvantageous in that the communication charge is relatively high and economical burdens upon users are increased. On the other hand, Dopa communication (e.g., packet communication provided by NTT-Docomo in Japan) requiring communication charge lower than the satellite communication has been practiced in recent years. With the Dopa communication, however, communication between the waste transporting vehicle and the SCMS management center cannot be established when the waste transporting vehicle is located in a communication-disabled area.

In view of the above, the inventor has previously proposed a system (SCMS III) in which communication between the waste transporting vehicle and the SCMS management center is performed using both the Dopa communication and the satellite communication in such a manner that the communication between them is established via the satellite communication in an area where the Dopa communication is disabled, but is established via the Dopa communication in an area where the Dopa communication is enabled.

The systems described above are effective in that, after a company under subcontract has received wastes, a company who has subcontracted disposal of the wastes monitors transportation of the wastes to a final disposal site and dumping of the wastes in the final disposal site. However, those systems cannot be said as being satisfactory for management with regard to "carrying-in of wastes before or after scheduled time", "carrying-in of wastes by vehicles other than scheduled", and "carrying-in of wastes other than permitted". This means that inhabitants around the final disposal site are still faced to a problem of worsening in environment.

SUMMARY OF THE INVENTION

In view of the state of the art set forth above, it is an object of the present invention to provide a system for managing carrying-in of wastes into a final disposal site, which can monitor transport routes of waste transporting vehicles, can monitor dumping situations of the wastes in the final disposal site, and enables even a third party to monitor them.

To achieve the above object, according to a first aspect of the present invention, there is provided a system for managing dynamic situations of wastes and waste transporting vehicles using barcodes, the system comprising means for measuring a position of each of the waste transporting vehicles; and means for monitoring a transport route of each vehicle based on the measured position, wherein when the measuring means measures the position of the waste transporting vehicle, the monitoring means monitors the transport route of the vehicle based on the measured position, thereby managing the transport route of the vehicle and arrival to a disposal site in real time in a centralized manner.

According to a second aspect of the present invention, there is provided a system for managing dynamic situations of wastes and waste transporting vehicles using barcodes, the system further comprising means for monitoring a vehicle transporting wastes to a disposal site, whereby arrival of the waste transporting vehicle to the final disposal site is monitored.

According to a third aspect of the present invention, there is provided a system for managing dynamic situations of wastes and waste transporting vehicles using barcodes, the system further comprising means for monitoring a vehicle transporting wastes to a disposal site, the monitoring means comprising an ID tag attached to the waste transporting vehicle and an ID tag reader provided in an access passage to the disposal site, whereby arrival of the waste transporting vehicle to the final disposal site is monitored.

According to a fourth aspect of the present invention, there is provided a system for managing dynamic situations of wastes and waste transporting vehicles using barcodes, the system further comprising means for monitoring a vehicle transporting wastes to a disposal site, the monitoring means comprising an ID tag attached to the waste transporting vehicle, an ID tag reader provided in an access passage to the disposal site, and an opening/closing gate opened and closed in accordance with a result of reading the ID tag, whereby arrival of the waste transporting vehicle to the final disposal site is monitored.

With the present invention having the features set forth above, the following advantages are obtained. Since the monitoring means monitors the transport route of the waste transporting vehicle, it is possible to manage the transport route of the waste transporting vehicle and arrival to the final disposal site in real time in a centralized manner. Also, by monitoring abnormality in the passage time along the transport route of the waste transporting vehicle (i.e., by managing time schedule in waste transportation), whether the waste transporting vehicle is under an abnormal condition or not can be monitored and checked with certainty. If the waste transporting vehicle is under an abnormal condition, a necessary instruction can be given to that vehicle from a system management center.

The time schedule in waste transportation can be managed with higher accuracy by correcting the scheduled passage time as appropriate depending on traffic information on that day. In some cases, for the purpose of cutting down the work time, the shortest route to the destination from the time point of view is set again as a new transport route to avoid a traffic jam.

The wastes carried into the final disposal site can be managed based on the travel route of the waste transporting vehicle, and management of the waste carrying-in time and determination of the incoming vehicle can be made with the provision of a gate management system in the final disposal site. It is therefore possible to prevent illegal waste dumping.

Since management information is distributed via the Internet, the information can be made open if necessary, and this is effective in mitigating anxiety in inhabitants.

Since the system of the present invention is a system transmitting manifest slip information to a manifest management center at the time of loading wastes, information including the place where an accident has occurred, the kind and amount of load (wastes), the countermeasure, actions to be taken into account, and so on can be automatically informed to the parties concerned, who are previously registered, in an urgent case.

DESCRIPTION OF THE PREFERRED EMBODIMENTS

Figure 1:
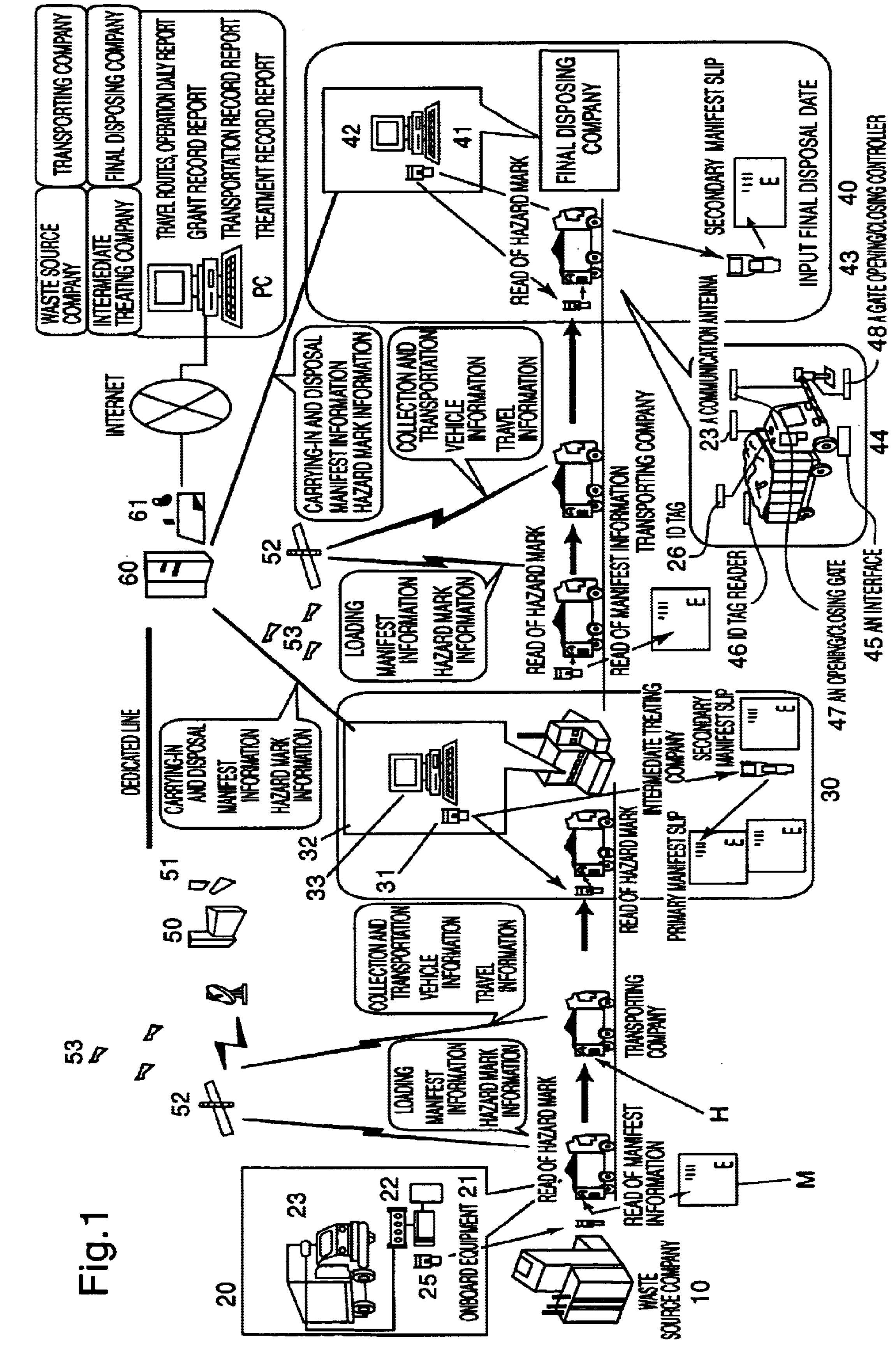
FIG. 1 is a diagram showing an outline of an entire system and for explaining flows of information.

A preferred embodiment of the present invention will be described below, but it is to be noted that details of system arrangement are not limited to those described in the following embodiment. Because a system for managing travel of waste transporting vehicles, according to the present invention, is implemented in the application form of SCMS II that is an improved version of SCMS, outlines of SCMS and SCMS II will be first described.

<SCMS>

In SCMS, a waste source company or business performs the following actions.

1. A code is set per each of waste generating places to be managed. (In response to an order from the waste source company, a barcode is prepared and delivered for each department or place under management.)
2. The prepared barcodes are delivered to the respective waste generating places. A label including a mark and the barcode arranged side by side is employed. The mark clearly indicates the fact that infectious wastes are contained.
3. The barcode label is pasted to a corresponding contained at the waste generating places.
4. When the container is filled with the infectious wastes, the container is carried to a depository in the site and stored there.

In SCMS, a collecting/transporting company performs the following actions.

1. It routinely collects wastes.
2. When collecting containers, information of a barcode is read with a barcode reader for each container.
3. The weight of each container is measured.
4. Several items of information are inputted to a terminal (handy terminal) for satellite communication.
5. It receives a manifest slip.
6. Information regarding travel of each travel from departure to return is automatically recorded. A service management system used with omnitrucks for recording position information and travel routes, automatically preparing operation daily reports, etc. can be employed.
7. When mismatch between collection/transportation and carrying-in is notified from a manifest management center, the collecting/transporting company and the waste source company confirms the notified mismatch and makes clear the cause.

In SCMS, an intermediate treating company performs the following actions.

1. When the infectious wastes are carried to the intermediate treating company by the collecting/transporting company, data regarding the carried-in infectious wastes is read with a barcode reader for each container.
2. The infectious wastes are temporarily stored in a factory until the intermediate treatment is performed.
3. When the stored infectious wastes are subjected to the intermediate treatment, the barcode data is read again and information regarding the date of the treatment is transmitted to the system.
4. When any mismatch is notified from the manifest management center, the intermediate treating company or the collecting/transporting company confirms the notified mismatch and makes correction of the data.
5. Vehicle travel management data is provided to all parties concerned.

Corresponding to the above-described actions performed by the collecting/transporting company and the intermediate treating company, the manifest management center performs the following actions.

1. It receives, via a communication satellite, the data obtained at the time of waste collection by the collecting/transporting company.
2. It receives, from the intermediate treating company, the data regarding carrying-in of the wastes to the intermediate treating company and the intermediate treatment of the wastes therein.
3. It checks the received data regarding the collection, carrying-in and treatment of the wastes. If there is any mismatch, the center prints out the mismatch data and notifies it to the concerned companies for confirmation.
4. When the confirmation in above 3 is not made, the center notifies the matter to the relevant self-governing community or the waste source company, and instructs all of the parts concerned to make clear the cause.

With the system described above, the self-governing community (any of metropolis and districts or cites, towns and villages) can execute the following operations.

1. It is able to manage actual situations of the collection, transportation, and intermediate treatment of infectious wastes in real time by obtaining information of the wastes through online data exchange between the system of the management center and a ground management system of the self-governing community.
2. Because of reliable and simple management of the infectious wastes, the necessity of presenting administrative reports are eliminated and management works are simplified.
3. With omission of administrative reports from the waste source company and the other handling/treating companies, there is no necessity of storing those reports, whereby management works are further simplified.
4. It is possible to easily make check of manifests that are prepared by the waste source company and the other handling/treating companies, the check being hardly performed at present. Therefore, management, storage, etc. of administrative reports are simplified.

A description is now made of, with reference to the drawings, equipment and devices required for the waste source company, the collecting/transporting company, the treating/disposing company, and the management center (manifest management center) to construct the above-described system. FIG. 1 is a diagram showing an outline of the system for managing dynamic situations of wastes according to the present invention and for explaining flows of position information and travel information of waste transporting vehicles.

<Waste Source Company>

A waste source company 10 prepares a waste management seal (hazard mark kit) H and a primary manifest slip $M_1$, the seal H containing data, source place data, kind of wastes, etc. put on it.

In principle, the various data are put on the waste management seal H and the manifest slip $M_1$ in the form of a barcode. When there is a large amount of information, it is preferable to employ a well-known two-dimensional barcode.

Also, a terminal unit (personal computer) for management of the manifest slip and web distribution/reception is provided to the waste source company.

<Collecting/Transporting Company>

Figure 2:
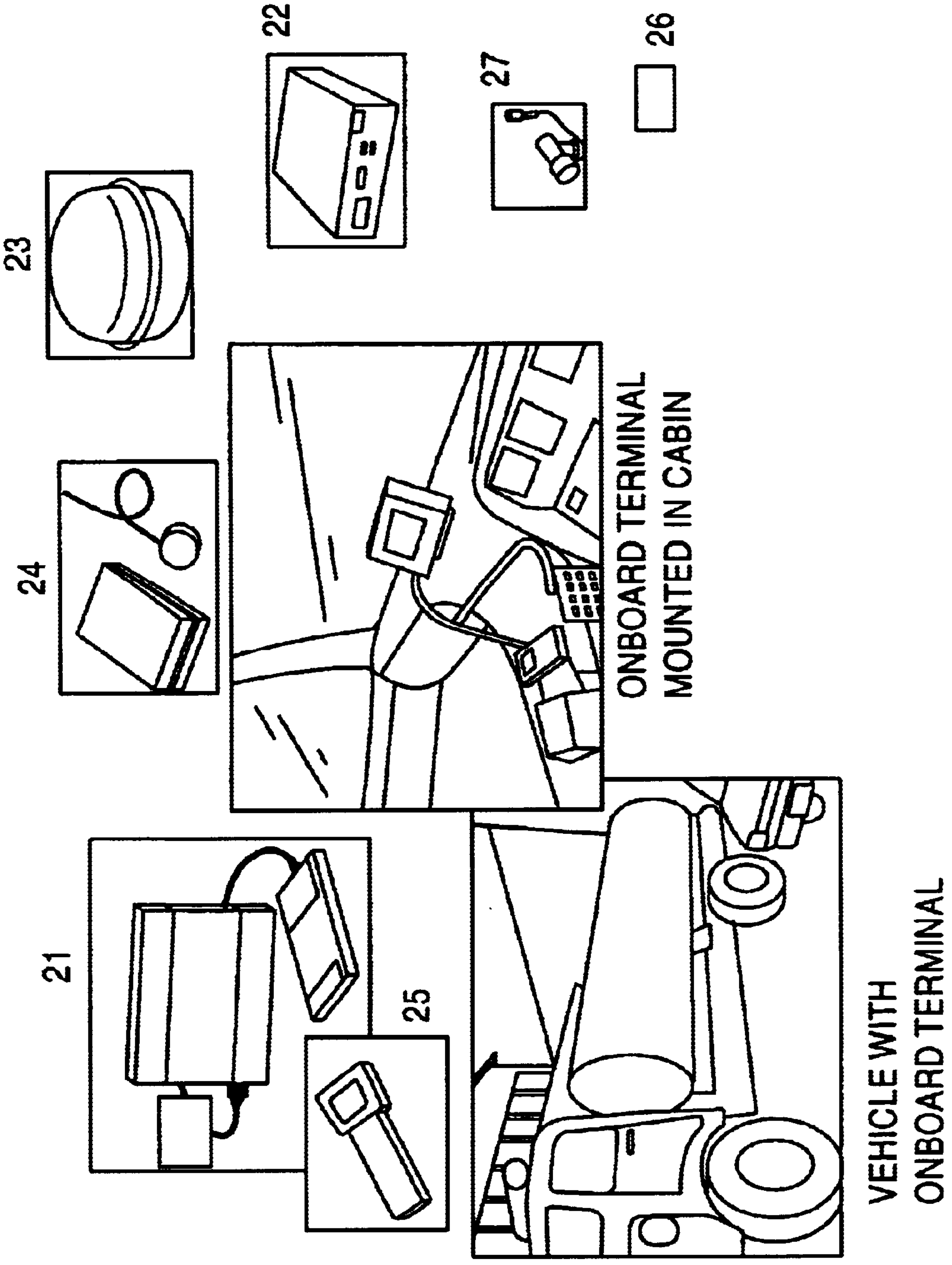
FIG. 2 shows a set of onboard equipment.

As shown in FIG. 2, a waste transporting vehicle 20 includes an onboard terminal 21 with an operating keyboard for entering work situations, a communication unit 22 for transmitting the manifest slip information and the travel information, a communication antenna 23 with a built-in GPS antenna for confirming the current position of the waste transporting vehicle 20, a GPS locating unit 24, and a barcode reader 25 for reading the manifest slip $M_1$ and the waste management seal H. Further, an ID tag 26 (see FIG. 3) capable being read in a non-contact manner is attached to the cabin roof of the waste transporting vehicle 20, the ID tag 26 being used to monitor entry of the waste transporting vehicle 20 to a final disposal site.

In addition, a terminal unit for management of the manifest slip, travel management, and web distribution/reception is provided to an office of the collecting/transporting company.

Though not shown, the waste transporting vehicle 20 is equipped with a vehicle speed sensor for management of travel and work, and a panic button for risk management.

<Disposal Site>

Disposal of wastes is performed in two stages, i.e., intermediate treatment in which the wastes are treated to be adapted for final filling-up through such steps as incineration, crushing, sorting and neutralization, and a final waste disposal in which the treated wastes are dumped for filling-up in accordance with the filling-up criteria. The former disposal is performed in an intermediate treatment site, and the latter disposal is performed in a final disposal site.

<Intermediate Treatment Site>

An intermediate treatment site 30 includes a barcode reader 31 for reading the manifest slip information and the waste management information for waste receipt and disposal certification, a data communication unit 32 such as a telephone line, a packet communication line, a cellular phone line and a radio line, and a terminal unit for management of the manifest slip and web distribution/reception.

In the intermediate treatment site, there are provided a carrying-in terminal in which the waste transporting vehicle 20 unloads wastes, and a carrying-out terminal from which the wastes having been subjected to the intermediate treatment is carried out to the final disposal site.

Further, the intermediate treating company prepares a secondary manifest slip $M_2$ used for management of step of carrying out the wastes having been subjected to the intermediate treatment to the final disposal site.

<Final Disposal Site>

A final disposal site 40 includes a terminal unit 41 in which an interface and communication software are incorporated.

In the final disposal site 40, a terminal dedicated for the waste transporting vehicle is provided. A vehicle sensor (not shown), an opening/-closing gate 47, and a gate opening/closing controller 48 for opening and closing the gate 47 are provided in an access passage to the final disposal site 40. Further, an ID tag reader 46 for reading information of the ID tag 26 attached to the waste transporting vehicle 20.

<Manifest Management Center>

A manifest management center 60 includes a host computer having the functions as follows:

1. FMS server
2. Travel management universal software (FMS)
3. Dedicated terminal PC (Client terminal PC)
4. FEP distribution control routine
5. Interface and communication software
6. Data entry screen customizer
7. Ground communication equipment for changing a system for managing carrying-in of wastes to the final disposal site The operation of the system including the above-mentioned equipment and devices will be described below.

<Waste Source Company>

The waste source company 10 delivers the primary manifest slip $M_1$ to the collecting/transporting company and then pastes the seal management seal H to each container of wastes.

Note that, as with a conventional manifest slip, the manifest slip $M_1$ is disposed of under consent among the waste source company, the collecting/transporting company and a treating/disposing company.

<Collecting/Transporting Company>

At the time of collecting wastes, the collecting/transporting company makes operation to read the barcode of the manifest slip and the barcode of the management seal pasted to the waste container.

The amount (load shape, weight, volume, etc.) of wastes is also inputted using a ten-key numeral pad.

After the end of the collection work, manifest information is transmitted via a communication satellite 52 based on the information read in the above steps.

Then, the company starts to transport the wastes to the treating/disposing company.

During the transportation, the current position of the waste transporting vehicle is confirmed using the GPS locating system (including a GPS satellite 53), and the confirmed position information is reported to the manifest management center 60 routinely (at intervals of, e.g., 30 minutes) via the onboard communication unit, the communication satellite and a communication center.

<Intermediate Treatment Site>

In the intermediate treatment site, the barcode pasted to the waste container having been carried in by the collecting/transporting company is read with a barcode reader provided therein, and the waste carrying-in information thus read is transmitted to the communication (network) center 50.

The intermediate treating company delivers the secondary manifest slip $M_2$. The barcode representing the manifest information (treatment information) is also read using the barcode and then transmitted to the communication center 50 via the communication satellite.

The wastes having been subjected to the intermediate treatment by the intermediate treating company is carried to the final disposing company by the collecting/transporting company.

At the start of the transportation, the barcodes representing the manifest information and the hazard mark information are read with the barcode reader and then transmitted to the communication center 50 via the communication satellite 52. The communication center 50 transmits the received information to the manifest management center 60 via a dedicated line.

During the transportation, as with the above case, the current position of the waste transporting vehicle is confirmed using the GPS locating system (including a GPS satellite 53), and the confirmed position information is reported to the manifest management center 60 routinely (at intervals of, e.g., 30 minutes) via the onboard communication unit, the communication satellite and the communication center.

<Final Disposal Site>

In the final disposal site, an access monitor reads information of the ID tag 26 attached to the waste transporting vehicle 20, and if the incoming vehicle is confirmed as being one permitted to carry in wastes, the opening/closing gate 47 is opened to allow entry of the vehicle.

The barcodes representing the manifest information and the hazard mark information are read with the barcode reader 43 and then transmitted to the communication center 50 via the communication satellite 52 along with the final disposal data. The communication center 50 transmits the received information to the manifest management center 60 via the dedicated line.

<Communication Center>

The communication center 50 receives the position information and the travel information of the waste transporting vehicle via the communication satellite 52, and then transmits the received information to the manifest management center 60 via the dedicated line.

<Manifest Management Center>

The manifest management center 60 receives the information from the waste transporting vehicle via the communication center, receives the information from the intermediate treating company and the final disposing company via the telephone line, and then processes the received information.

More specifically, the manifest management center 60 performs the following actions.

1. Receives the manifest slip information at the time of collection.
2. Receives the manifest slip information transmitted from the treating/disposing company.
3. Checks the information in above 1 and 2 for matching of data.
4. Informs abnormality to the parties concerned if there is abnormality in data checked for matching.
5. Distributes the travel information.
6. Distributes the data for each source place in the waste source company.
7. Distributes the manifest slip information.

Based on the received information, the manifest management center 60 prepares travel routes, an operation daily, a grant record report, a transportation record report and a disposal record report, and then distribute them to the waste source company, the collecting/transporting company, the intermediate treating company, and the final treating company via the Internet. Also, if necessary, the prepared data is made accessible by the third party (including, e.g., inhabitants and the relevant administrative organization).

Further, if the panic button of any of the waste transporting vehicles 20 is manipulated, the manifest management center 60 urgently informs the current position and load of that waste transporting vehicle, and the countermeasure to be taken, etc. to the parties concerned who are previously registered.

<SCMS II>

SCMS II that is an improved version of the "waste electronic manifest information management system (called SCMS)", set forth above, will now be described. In SCMS II, information collection is performed based on information directly indicating dynamic situations of waste transporting vehicles instead of reading a barcode. In other words, SCMS II can be implemented by setting an onboard terminal for satellite communication, which is used in SCMS, in each of permitted waste transporting vehicles and then doing works in the same manner as in SCMS. More specifically, information regarding dynamic situations of the waste transporting vehicle is collected by adding, to each waste transporting vehicle used with SCMS, the function of sensing actuation of a loading device with a sensor at the time of loading wastes on the vehicle and then transmitting sensed information to an SCMS management (network) center via the communication satellite, the function of sensing dumping or unloading operation performed for disposal of the wastes that have been carried into an incineration facility, and then transmitting sensed information to the SCMS management (network) center via the communication satellite, etc.

Waste management in accordance with SCMS II is automatically performed at the network center (SCMS management center installed in, e.g., Nisscom Corporation (Japan)) using the satellite communication system. Data regarding when and where the waste transporting vehicle has collected wastes and when and where the waste transporting vehicle has unloaded the collected wastes, etc. is obtained using the satellite communication system (SCMS II). The obtained data is automatically subjected to matching work with a computer so as to check whether the obtained data are matched with the preset management information and conditions. Illegal dumping of wastes is thus prevented by monitoring the occurrence of problems such as "waste dumping outside designated area" and "improper mixing of wastes".

<Gate Management System in Final Disposal Site>

The present invention is featured in that a gate management system 44 is provided in the final disposal site in addition to the basic construction described above. The construction of the gate management system 44 will be described below.

Figure 3:
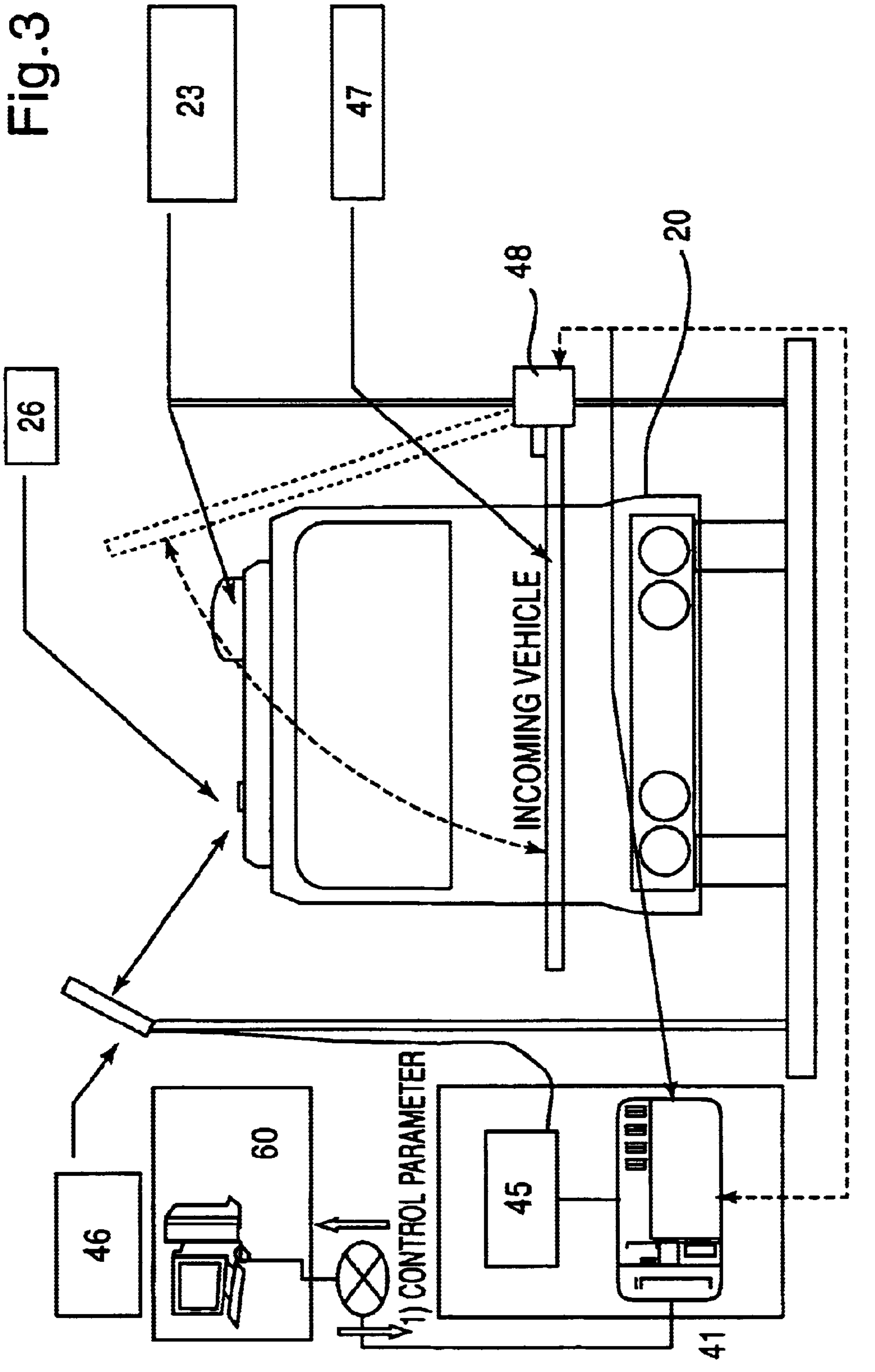
FIG. 3 is a schematic view of a gate management system in a final disposal site.

FIG. 3 is a schematic view of the gate management system 44 provided in an access passage to the final disposal site. The gate management system 44 in the final disposal site comprises a terminal unit 41, a vehicle sensor (not shown) for sensing the direction in which a vehicle passes, an ID tag reader 46 vertically provided at a side of the access passage, a gate opening/closing controller 48, and an opening/closing gate 47 opened and closed by the gate opening/closing controller 48. The gate opening/closing controller 48 has the function of determining whether the vehicle is a permitted one or not, based on data read by the ID tag reader 46, and the function of setting a monitoring time. Further, the gate opening/closing controller 48 is connected to the network center (manifest management center) 60 via an interface 45 for transmitting the vehicle number, gate passage information and usage information of the particular ID to the network center.

Moreover, the gate opening/closing controller 48 is designed to be able to remotely set the entry allowed time zone, addition and deletion of permitted vehicles, etc. in response to an instruction from the relevant self-governing community.

The thus-constructed gate management system 44 in the final disposal site operates as follows.

1. The ID tag reader 46 reads the ID of a vehicle that has stopped at the opening/closing gate 47. When the stopping vehicle is a permitted one, the opening/closing gate 47 is opened to allow entry of that vehicle. If the stopping vehicle is one provided with no ID tag or has the ID not permitted, the opening/closing gate 47 is not opened to block entry of that vehicle.
2. Passage record data (date, time and the vehicle ID) is notified to the network center for each passage along with usage information of the special ID, and so on.
3. The network center totalizes and manages the notified data for each vehicle.

The above description has been made in connection with routine waste disposal. In exceptional waste disposal, however, special vehicles (heavy equipment such as shovels and excavators) are also permitted to enter the final disposal site frequently. A not-easily removable ID tag (special ID tag) is attached to each of those vehicles, and travel situations of the vehicles are checked for each entry to the site by using the special ID tag. Checked data is reported to the relevant self-governing community. When vehicles must be allowed to enter the site for urgent purpose, several special ID tags are prepared to allow the entry of the vehicles based on those special ID tags. Usage situations of the special ID tags are managed by the center and then reported to the relevant self-governing community per month.

What is claimed is:

1. A system for managing dynamic situations of wastes and waste transporting vehicles using barcodes, the system comprising:

means for measuring a position of each of the waste transporting vehicles; and means for monitoring a transport route of each vehicle based on the measured position, wherein when the measuring means measures the position of the waste transporting vehicle, the monitoring means monitors the transport route of the vehicle based on the measured position, thereby managing the transport route of the vehicle and arrival to a disposal site in real time in a centralized manner.

2. A system for managing dynamic situations of wastes and waste transporting vehicles using barcodes according to claim 1, further comprising means for monitoring a vehicle transporting wastes to a disposal site, whereby arrival of the waste transporting vehicle to the final disposal site is monitored.

3. A system for managing dynamic situations of wastes and waste transporting vehicles using barcodes according to claim 1, further comprising means for monitoring a vehicle transporting wastes to a disposal site, the monitoring means comprising an ID tag attached to the waste transporting vehicle and an ID tag reader provided in an access passage to the disposal site, whereby arrival of the waste transporting vehicle to the final disposal site is monitored.

4. A system for managing dynamic situations of wastes and waste transporting vehicles using barcodes according to claim 1, further comprising means for monitoring a vehicle transporting wastes to a disposal site, the monitoring means comprising an ID tag attached to the waste transporting vehicle, an ID tag reader provided in an access passage to the disposal site, and an opening/closing gate opened and closed in accordance with a result of reading the ID tag, whereby arrival of the waste transporting vehicle to the final disposal site is monitored.

* * * * *